(12) United States Patent
Guyomarc'h

(10) Patent No.: US 9,327,971 B2
(45) Date of Patent: May 3, 2016

(54) PROCESS, SYSTEM AND INSTALLATION FOR TREATING LIQUID AND/OR PASTY HYDROCARBON MATERIALS

(71) Applicant: SEE-SOLUÇÕES, ENERGIA E MEIO AMBIENTE LTDA, São Paulo (BR)

(72) Inventor: Raymond Guyomarc'h, Caussade (FR)

(73) Assignee: See-Soluções, Energia e Meio Ambiente LTDA, São Paulo (BR)

( * ) Notice: Subject to any disclaimer, the term of this patent is extended or adjusted under 35 U.S.C. 154(b) by 0 days.

(21) Appl. No.: 14/376,840

(22) PCT Filed: Feb. 5, 2013

(86) PCT No.: PCT/FR2013/050240
§ 371 (c)(1),
(2) Date: Aug. 5, 2014

(87) PCT Pub. No.: WO2013/117854
PCT Pub. Date: Aug. 15, 2013

(65) Prior Publication Data
US 2015/0014593 A1     Jan. 15, 2015

(30) Foreign Application Priority Data

Feb. 9, 2012 (FR) .................................. 12 00387

(51) Int. Cl.
*C01B 3/38* (2006.01)
*C01B 3/36* (2006.01)
(Continued)

(52) U.S. Cl.
CPC . *C01B 3/36* (2013.01); *B01J 8/085* (2013.01); *B01J 8/12* (2013.01); *B01J 19/006* (2013.01); *B01J 19/2495* (2013.01); *C01B 3/00* (2013.01); *C01B 3/34* (2013.01); *C10B 55/04* (2013.01); *F23G 5/027* (2013.01); *F23G 7/14* (2013.01); *B01J 2208/00061* (2013.01);
(Continued)

(58) Field of Classification Search
USPC ......................................................... 252/373
See application file for complete search history.

(56) References Cited

U.S. PATENT DOCUMENTS 3,201,215 A    8/1965    Negra et al.
3,915,840 A    10/1975   Gladrow et al.
(Continued)

FOREIGN PATENT DOCUMENTS

GB        757333 A       9/1956
GB        2125430 A      3/1984

*Primary Examiner* — Melvin C Mayes
*Assistant Examiner* — Kenneth Vaden
(74) *Attorney, Agent, or Firm* — Volpe and Koenig, P.C.

(57) ABSTRACT

The invention relates to a process for treating liquid and/or pasty hydrocarbon materials, more particularly fuel oil, more particularly still heavy fuel oil, in which the hydrocarbon materials are firstly brought to the autoignition temperature, then mixed with a controlled amount of oxygen in order to obtain a first gaseous stream and a non-gaseous mass, more particularly a solid mass, comprising solid hydrocarbon molecules which are then oxidized by a gaseous stream of $CO_2$ in order to obtain a second gaseous stream. The first and second gaseous streams are then mixed in order to obtain a third gaseous stream comprising carbon monoxide having a high energy value. The invention also relates to a system implementing the process according to the invention and an installation implementing such a system.

11 Claims, 2 Drawing Sheets

(51) Int. Cl.
*B01J 8/08* (2006.01)
*B01J 8/12* (2006.01)
*B01J 19/00* (2006.01)
*B01J 19/24* (2006.01)
*C01B 3/34* (2006.01)
*F23G 5/027* (2006.01)
*F23G 7/14* (2006.01)
*C01B 3/00* (2006.01)
*C10B 55/04* (2006.01)

(52) U.S. Cl.
CPC .............. *B01J 2208/0092* (2013.01); *B01J 2208/00132* (2013.01); *B01J 2208/00309* (2013.01); *B01J 2219/00063* (2013.01); *B01J 2219/00081* (2013.01); *B01J 2219/00117* (2013.01); *C01B 2203/0211* (2013.01); *C01B 2203/0216* (2013.01); *C01B 2203/0222* (2013.01); *C01B 2203/0255* (2013.01); *C01B 2203/0811* (2013.01); *C01B 2203/1247* (2013.01); *C01B 2203/1282* (2013.01); *C01B 2203/142* (2013.01); *C01B 2203/143* (2013.01); *C01B 2203/1614* (2013.01); *C01B 2203/1619* (2013.01); *F23G 2201/40* (2013.01)

(56) References Cited

U.S. PATENT DOCUMENTS

| | | |
|---|---|---|
| 4,070,160 A | 1/1978 | Cottle |
| 4,265,868 A | 5/1981 | Kamody |
| 4,382,915 A | 5/1983 | Sadhukhan et al. |
| 4,725,381 A | 2/1988 | Pinto |
| 5,213,587 A | 5/1993 | Ekström et al. |
| 6,444,179 B1 | 9/2002 | Sederquist |
| 7,494,574 B2 | 2/2009 | Kong et al. |
| 2006/0130401 A1 | 6/2006 | Giglio et al. |
| 2009/0211444 A1 | 8/2009 | Lissianski et al. |
| 2010/0293845 A1 | 11/2010 | Zeman et al. |
| 2011/0303875 A1 | 12/2011 | Hoteit et al. |

PROCESS, SYSTEM AND INSTALLATION FOR TREATING LIQUID AND/OR PASTY HYDROCARBON MATERIALS

FIELD OF THE INVENTION

The invention relates to a process for treating liquid and/or pasty hydrocarbon-based materials. It also relates to a system implementing such a process and to an apparatus implementing such a system.

The field of the invention is the field of the treatment of liquid and/or pasty hydrocarbon-based materials, more particularly fuel oil and even more particularly heavy fuel oil, for example heavy fuel oil of category 2 or higher, of tar sands or else of earths polluted by hydrocarbons. The invention relates in particular to the conversion of hydrocarbon-based materials into syngas with a high energy value, such as syngas comprising $H_2$ and CO.

BACKGROUND

Heavy fuel oil, for example, which has an initial viscous pasty appearance, is currently used in diesel engines. It comprises a liquid part and a solid part. Before it is used in diesel engines, it is necessary to separate the solid part from the liquid part by means of a prior heat treatment using a heat treatment device in decanting systems and then by centrifugation at 80/100° C. It is only the liquid part which is used as fuel in internal combustion diesel engines. The solid part, which is rich in hydrocarbon-based compounds, is not exploited. However, the need for prior thermomechanical treatments of heavy fuel oil for the purpose of using only the liquid part penalizes the overall yield. Consequently, heavy fuel oil is only rarely used despite its availability.

With regard to heavy fuel oils of at least category 2, tar sands or earths polluted by hydrocarbons, no advantageous use is known in terms of yield with a view to exploiting the energy potential of these materials rich in hydrocarbon-based compounds. These materials currently constitute polluting waste that it is necessary to treat for the purpose of eliminating them, with little or no energy recovery.

The present invention proposes to remedy the abovementioned drawbacks.

SUMMARY

Another objective of the invention is to provide a process and system for treating hydrocarbon-based materials having a higher overall yield than the current processes and systems.

Yet another objective of the invention is to provide a process and system for treating hydrocarbon-based materials which make it possible to exploit the energy of liquid and/or pasty hydrocarbon-based materials which are unexploitable with the existing treatment processes and systems.

Finally, another objective of the present invention is to provide a process and a system for treating hydrocarbon-based materials which make it possible to convert the hydrocarbon-based materials into a source of energy that can be exploited by existing devices.

The invention makes it possible to achieve at least one of the abovementioned objectives by means of a process for treating liquid and/or pasty hydrocarbon-based materials, more particularly fuel oil, even more particularly heavy fuel oil, characterized in that it comprises the following steps:
  bringing of said hydrocarbon-based materials to a temperature greater than or equal to the autoignition temperature of said hydrocarbon-based materials, for example greater than or equal to 200° C.;
  gasification of said hydrocarbon-based materials by injection of a controlled amount of oxygen, which causes a partial oxycombustion of the hydrocarbons, said gasification producing:
    a first gaseous stream at a temperature of greater than or equal to 800° C. comprising CO and $H_2O$ molecules, hydrocarbon-based molecules in the gaseous phase and possibly $H_2$ molecules, and
    a non-gaseous feedstock comprising non-gaseous hydrocarbon-based molecules, which are more particularly solid;
  oxidation of said non-gaseous hydrocarbon-based molecules contained in said non-gaseous feedstock, by means of an "oxidation" gaseous stream consisting of $O_2$ and of $CO_2$ at a temperature of between 1000° C. and 1200° C., said oxidation producing a second gaseous stream comprising $CO_2$, $O_2$ and $H_2O$ molecules;
  mixing of said first and said second gaseous streams, said mixing causing the oxidation of said gaseous-phase hydrocarbon-based molecules present in the first gaseous stream by $CO_2$ and $O_2$ molecules present in the second gaseous stream, said mixing producing a third gaseous stream comprising CO and $H_2O$ molecules and possibly $H_2$ molecules.

The second gaseous stream is exclusively composed of hyperreactive oxidizing agents, the object of which is to complete the redox reaction by reducing them using the gaseous hydrocarbon-based molecules of the first gaseous stream in order to generate CO and possibly $H_2$.

Thus, the process according to the invention makes it possible to complete the conversion of the hydrocarbon-based molecules into CO and $H_2$ which is a syngas with a high energy value and to increase the amount of hydrocarbon-based materials converted and, consequently, the overall yield of the process.

Carbon monoxide is a gas with a high energy value, the energy of which can be exploited by the current devices.

The process according to the invention makes it possible to exploit the volatile part of a hydrocarbon-based material by injection of oxygen and "redox" reaction via an oxidizing agent (for example $CO_2$ or any other gaseous oxide ($NO_x$, $SO_x$, etc.) and/or solid oxide: NiO, CaO, FeO, etc.) that is found in materials polluted by hydrocarbons and/or in gaseous effluents in order to obtain a gaseous stream comprising carbon monoxide.

The process according to the invention makes it possible, contrary to the current processes and devices, to also exploit the non-gaseous part, i.e. the solid part, of the hydrocarbon-based material in order to produce, with the carbon elements present in this solid part, a second gaseous stream composed essentially of carbon dioxide ($CO_2$) which is reactive at a temperature of between 1000° C. and 1200° C., which is then used to reduce the gaseous hydrocarbon-based molecules present in the first gaseous stream and to increase the amount of carbon monoxide present in the third gaseous stream.

The process according to the invention therefore makes it possible to exploit a larger amount of a given feedstock of a hydrocarbon-based material in comparison with the current processes and systems, such that the overall yield of the process according to the invention is greater than the overall yield of prior art processes and systems.

Furthermore, it is possible, with the process according to the invention, to convert hydrocarbon-based materials which are unexploitable with the current devices, such as tar sands and earths polluted by hydrocarbons, into a gaseous stream which can be exploited by the current devices.

According to the invention, the injection of $O_2$ during the gasification step is carried out such that the oxycombustion of the hydrogen of the hydrocarbon-based molecule generates the energy for raising the temperature of the medium and providing a first gaseous stream at a temperature of at least 800° C.

The process according to the invention may also comprise a step of thermal conditioning of the first gaseous stream before the mixing of the first gaseous stream with the second gaseous stream.

Such thermal conditioning may comprise, and more particularly consist of, an exchange of heat between the first gaseous stream and the second gaseous stream, for example through a heat exchanger.

In one particular embodiment, the step of bringing the hydrocarbon-based materials to a temperature greater than or equal to the autoignition temperature can be carried out by indirect heating of said hydrocarbon-based materials, for example by heat exchange with a hot gaseous stream in a heat exchanger or by electrical heating or by any other equivalent means.

Such a gaseous stream may be the third gaseous stream, used for heating the hydrocarbon-based materials before being used as syngas which is an energy source and/or molecular base for other synthesis combinations.

In one preferential embodiment of the process according to the invention, the step of bringing the hydrocarbon-based materials to a temperature greater than or equal to the autoignition temperature can be carried out by mixing said hydrocarbon-based materials with a gaseous effluent having a temperature greater than or equal to the temperature of the hydrocarbon-based materials, for example a temperature greater than or equal to 200° C., and preferentially greater than or equal to 300° C.

The oxygen used for the gasification is injected directly into the gaseous effluent before the latter is mixed with the hydrocarbon-based materials, the objective being to cause a primary oxycombustion of the hydrocarbon-based materials in order to raise the temperature of the whole thing to a temperature greater than or equal to 800° C., which promotes the pyrolysis of said hydrocarbon-based materials.

In one particularly advantageous version, the gaseous effluent may be an exhaust gas from a fuel combustion device, such as an internal combustion engine, such an exhaust gas comprising $N_2$, $CO_2$, $NO_x$, $SO_x$, CO, organic particles and $O_2$.

Such an exhaust gas may also consist of or comprise industrial flue gases.

This version of the process according to the invention is particularly advantageous since, in this version, the process according to the invention makes it possible to treat an exhaust gas with a view to recovering:
  the thermal energy represented by the temperature of such an exhaust gas for heating the hydrocarbon-based materials, and
  the energy represented by the CO molecules (and the combustible carbon-based particles which will be oxidized to CO) present in the exhaust gas, these CO molecules being recovered at the end of the process according to the invention.

In this version, the exhaust gas is initially at, or raised by any means (as previously specified) to, a preferential temperature of at least 300° C. The exhaust gas composed of the combustion gases comprising $N_2$, $CO_2$, $NO_x$, $SO_x$, CO, various aerosol particles and excess oxygen is used to bring the hydrocarbon-based materials to an autoignition temperature.

The first gaseous stream is then composed of the molecules of the exhaust gas: $N_2$, $CO_2$ (partly converted to CO by the reduction of the carbons of the oxy-combusted hydrocarbon-based molecules), $NO_x$, $SO_x$, CO, $H_2O$ (originating from the exo-energetic oxido-dehydrogenation of said hydrocarbon-based molecules), CO originating from the redox reduction of the carbons of the dehydrogenated molecules by oxidizing $CO_2$ present in the exhaust gas, gaseous-phase hydrocarbon-based molecules, and possibly $H_2$ molecules.

The oxycombustion of the hydrogen of the hydrocarbon-based molecule generates the energy for raising the temperature of the medium, initiating the redox reaction of the oxidizing agents, present in the gaseous stream, on the carbons already in reducing agent state, and providing a first gaseous stream at a temperature of at least 800° C.

In this preferential version of the process according to the invention, the mixing of the first and second gaseous streams produces the deoxidation, by the gaseous hydrocarbon-based molecules present in the first gaseous stream, of the $NO_x$ and $SO_x$ molecules present in the first gaseous stream and of the $CO_2$ and $O_2$ molecules present in the second gaseous stream, the third gaseous stream then comprising the following molecules: $N_2$, $S_2$, CO, $H_2O$, and possibly $CO_2$ and $H_2$ molecules at a temperature of between 1000 and 1200° C.

Thus, in this particularly advantageous version, the process according to the invention also makes it possible to crack and to reduce particularly polluting molecules present in the exhaust gas, such as $NO_x$ and $SO_x$ molecules, that will be discharged in the form of $N_2$ in the nitrogen present in the effluent treated and the sulfur that will be recovered upstream during a cooling phase.

In a second particularly advantageous version, the process according to the invention may have the objective of carrying out the conversion of $CO_2$, by hydrocarbon-based materials, into syngas (CO and $H_2$). This syngas can then be used in existing conventional systems (whereas the basic hydrocarbon-based materials may not be exploitable without a treatment that is difficult to make viable).

In this case, the gaseous effluent may be a gaseous stream consisting of $CO_2$. In this case, the oxygen added to said gaseous effluent is proportionate to the amount of hydrocarbon-based molecules to be oxidized in order to generate the energy for gasification (pyrolysis) of the hydrocarbon-based materials.

This second version of the process according to the invention makes it possible to increase the CO concentration of the first gaseous stream. Moreover, in this version, the first gaseous stream may also comprise $H_2$ which is also a gas with a high energy value.

Indeed, in this second advantageous version, the first gaseous stream comprises CO, $H_2$ and $H_2O$ molecules and hydrocarbon-based molecules in the gaseous phase and possibly $CO_2$ molecules.

The oxycombustion of the molecular hydrogen of the hydrocarbon-based molecule generates the energy for raising the temperature of the medium and priming the redox reaction and providing a first gaseous stream at a temperature of at least 800° C.

In this second version, the second gaseous stream comprises $CO_2$, $O_2$ and $H_2O$ molecules. This second gaseous stream is exclusively composed of hyperreactive oxidizing agents, the object of which is to complete the redox reaction by reducing them via the gaseous hydrocarbon-based molecules of the first gaseous stream in order to generate CO and $H_2$. Thus, the mixing of the first and second gaseous streams produces the reduction, by the reducing elements (C and $H_2$) of the gaseous-phase hydrocarbon-based molecules present in the first gaseous stream, of the $CO_2$ molecules present in the first gaseous stream and/or the second gaseous stream. The controlled provision of excess $O_2$ molecules in the second gaseous stream produces the oxycombustion of the amount of $H_2$ molecules required to compensate for the endothermicity of the redox reactions and to maintain the temperature of said reactions, the third gaseous stream then comprising CO, $H_2$ and $H_2O$ molecules at a temperature of between 1000 and 1200° C.

Of course, in all the embodiments, the first and second gaseous streams may comprise sulfur-containing molecules of formula $SO_x$. These sulfur oxides are also deoxidized by the reducing elements (C and $H_2$) of the hydrocarbon-based molecules present in the first gaseous stream, during the redox reaction.

The process according to the invention may advantageously comprise a controlled additional injection of oxygen during the step of oxidation of fixed carbons which are present in the non-gaseous feedstock and which are non-gasifiable.

This injection of oxygen generates the oxycombustion of said fixed carbons, which makes it possible to raise and maintain the temperature of the second gaseous stream to and at greater than 1000-1200° C. This excess $O_2$ provides the energy required for the endothermicity of reduction of the $CO_2$ molecules by the reducing carbons of the hydrocarbon-based molecules present in the first gaseous stream, according to the reaction $C+CO_2 \rightarrow 2CO+172$ kJ/mol.

In this case, the second gaseous stream may comprise $O_2$ molecules which will also partly oxidize the gaseous-phase hydrocarbon-based molecules present in the first gaseous stream.

In any event, the $CO_2$ introduced in the gasification and oxidation steps is proportioned so as to supplement the $CO_2$ generated by oxycombustion during said steps in order to provide the correct amount of oxidizing agents corresponding to the reducing hydrocarbon-based molecules, in the redox reaction generating the third stream, i.e. during the mixing step.

In any event, it may be that the gasification reaction is not completely carried out; liquid-phase hydrocarbon-based molecules may then be present with the (non-gasifiable) fixed carbons (of the starting materials) in the non-gaseous feedstock. These molecules will be completely oxidized by the $O_2$ injected for this purpose. The oxycombustion of these molecules will instantaneously generate the thermal energy sufficient, in this oxidizing medium, for the subsequent gasifiable molecules to be gasified, also instantaneously.

The process according to the invention may comprise a temperature control, for example by computer-based regulation, during each of the steps of the process according to the invention, which makes it possible to regulate the amount of each constituent of each of the reactions carried out: $O_2$ injected during the gasification and oxidation steps, the oxidation gaseous stream, the gaseous effluent used during the gasification, etc.

In any event, the process according to the invention comprises mixing of the first gaseous stream and of the second gaseous stream in order to obtain a third gaseous stream.

The process according to the invention may also comprise cooling of the third gaseous stream obtained after the mixing (and the redox reaction) of the first gaseous stream with the second gaseous stream. This cooling makes it possible to carry out recycling of the thermal capacity (sensitive heat) of the third gaseous stream and may advantageously be carried out by heat exchange with a gaseous stream of $CO_2$. The gaseous stream of $CO_2$ thus heated may advantageously be used as oxidation gaseous stream, and/or optionally as gaseous effluent for the increase in temperature of the hydrocarbon-based materials, when the step of bringing the hydrocarbon-based materials to the autoignition temperature is carried out by mixing said hydrocarbon-based materials with a gaseous effluent composed of $CO_2$.

Thus the process according to the invention makes it possible to carry out a recovery of the heat provided by the various reactions and to reuse this heat for the treatment of a new feedstock of hydrocarbon-based materials. The overall yield of the process according to the invention is thus improved.

The process according to the invention may also comprise a separation of the unwanted molecules during or after the cooling step. Such a separation can be carried out by condensation of the $S_2$ molecules, for example at a temperature of less than 440° C., and of the $H_2O$ molecules at a temperature of less than 50° C.

The syngas, comprising the carbon monoxide (CO) and the hydrogen ($H_2$) present in the third gaseous stream, obtained by virtue of the process according to the invention, can be exploited in any existing systems with atmospheric combustion (air-oxidized) or combustion under pure oxygen (oxycombustion) with a view to obtaining a gaseous stream comprising (or consisting of) $CO_2$ and $H_2O$. Such a gaseous stream comprising (or consisting of) $CO_2$ and $H_2O$ can be either reused in the process according to the invention or reused in a microalgal reactor for culturing microalgae.

According to another aspect of the invention, a system is provided for treating liquid and/or pasty hydrocarbon-based materials, more particularly fuel oil, even more particularly heavy fuel oil, characterized in that it comprises:

means for bringing said hydrocarbon-based materials to a temperature greater than or equal to the autoignition temperature of said hydrocarbon-based materials, for example greater than or equal to 200° C.;

means for gasification of said hydrocarbon-based materials by injection of a controlled amount of oxygen, said gasification producing:

a first gaseous stream at a temperature of greater than or equal to 800° C. comprising CO, $H_2O$ and possibly $H_2$ molecules and hydrocarbon-based molecules in the gaseous phase, and a non-gaseous feedstock comprising non-gaseous hydrocarbon-based molecules; and means for oxidation of said carbon elements contained in said non-gaseous feedstock, by means of an "oxidation" gaseous stream, at a temperature of between 500° C. and 800° C., consisting of $CO_2$ and of oxygen ($O_2$), said oxidation producing a second gaseous stream consisting essentially of $CO_2$, $H_2O$ and possibly $O_2$ molecules at a temperature of between 1000° C. and 1200° C.; and means for mixing said first and said second gaseous streams, said mixing providing a third gaseous stream comprising CO, $H_2O$ and possibly $H_2$ molecules.

In one particular embodiment, the means for bringing said hydrocarbon-based materials to a temperature greater than or equal to the autoignition temperature of said hydrocarbon-based materials may comprise means for mixing said hydrocarbon-based materials with a gaseous effluent.

According to yet another aspect of the invention, an apparatus is provided for treating liquid and/or pasty hydrocarbon-based materials, comprising:
- a system according to the invention and
- means for recovering at least a part of the heat from the third gaseous stream.

BRIEF DESCRIPTION OF THE DRAWINGS

Other advantages and characteristics will become apparent on examining the detailed description of embodiments which are in no way limiting, and the appended drawings on which.

DETAILED DESCRIPTION OF THE PREFERRED EMBODIMENTS

It is well known that the embodiments that will subsequently be described are in no way limiting. It will in particular be possible to imagine variants of the invention comprising only a selection of characteristics subsequently described, isolated from the other characteristics described, if this selection of characteristics is sufficient to confer a technical advantage or to differentiate the invention with respect to the prior art. This selection comprises at least one preferably functional characteristic without structural details, or with only some of the structural details if the latter are solely sufficient to confer a technical advantage or to differentiate the invention with respect to the prior art.

On the figures, the elements common to several figures keep the same reference.

Figure 1:
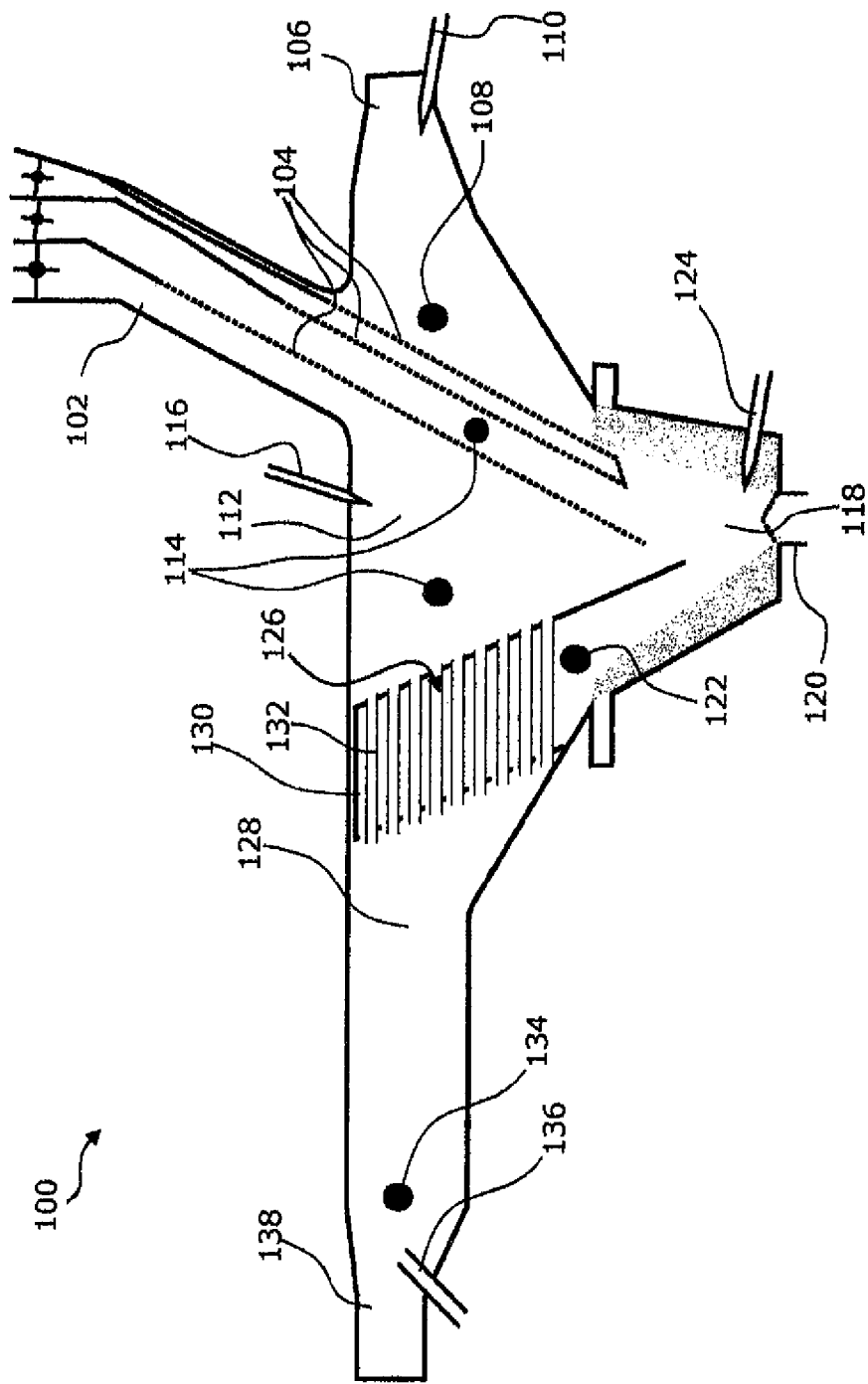
FIG. 1 is a representation of a system for treating hydrocarbon-based materials according to the invention.

FIG. 1 is a diagrammatic representation of a system for treating liquid and/or pasty hydrocarbon-based materials, and more particularly for converting liquid and/or pasty hydrocarbon-based materials into a syngas with a high energy value.

The system 100 of FIG. 1 comprises an opening 102 for introducing hydrocarbon-based materials onto one or more successive, inclined perforated plates 104 provided so as to receive and distribute these liquid and/or pasty hydrocarbon-based materials.

The system 100 also comprises an opening 106 for introducing a gaseous effluent at a temperature of at least 300° C., which can be a gaseous stream consisting of $CO_2$ or an exhaust gas from a heat engine or industrial flue gases or polluted gaseous effluents, etc. The temperature of the entering gaseous effluent is controlled via a probe 108 acting on the means for regulating the temperature of said effluent.

The system 100 also comprises an opening 110 for controlled injection of pure oxygen into the gaseous effluent before the perforated plates 104 when the gaseous effluent does not contain sufficient free oxygen, for example when the gaseous effluent is pure $CO_2$.

The opening 106 for introducing the gaseous effluent and the perforated plates 104 are arranged such that the gaseous effluent to which oxygen is added passes through the perforated plates 104, via the perforations present in these plates 104, from a front face to a back face and mixes with the hydrocarbon-based materials which are on this back face.

The mixing of the gaseous effluent with the hydrocarbon-based materials brings the latter to an autoignition temperature of at least 200° C. The presence of free oxygen in the gaseous effluent makes it possible to initiate an oxycombustion reaction of the hydrocarbon-based compounds which are already at the autoignition temperature. The distribution of the hydrocarbon-based materials on the perforated plates 104 is carried out in order for the amount of said materials, deposited on at least the first plate 104, to be completely oxidized (complete oxycombustion) and for the energy delivered to correspond to that which can be used to raise the temperature of the gaseous effluent to at least 800° C. by means of the $O_2$ contained in said gaseous effluent.

The free oxygen of the gaseous effluent enters into an oxycombustion reaction with the hydrocarbon-based compound, itself brought to its autoignition temperature by the hot gaseous effluent. This oxycombustion is controlled by the amount of free oxygen present in the gaseous effluent passing through the first perforated plate 104. The exothermicity of this combustion contributes to raising the ambient temperature and that of the hydrocarbon-based material present on the second perforated plate 104.

The energy generated by the oxycombustion produces a gasification of a part of the hydrocarbon-based material present on the second plate 104, and also an end of oxycombustion if there is residual oxygen in the gaseous effluent after the first oxycombustion carried out between the first two perforated plates 104. The amount of oxygen introduced via the orifice 108 can advantageously be defined such that there is an excess which oxidizes a part of the hydrocarbon-based materials deposited on the second perforated plate 104 in order for the energy delivered to allow the gasification of a greater amount of hydrocarbon-based materials deposited on a third (and optionally an nth) perforated plate 104. Thus, the repetitive oxidations are calculated and controlled such that the sum of the energies delivered makes it possible to carry out rapid and complete gasification of the vaporizable materials contained in the defined amount of hydrocarbon-based material to be gasified in the period of time, this gasification producing:
- a first gaseous stream at a temperature of greater than or equal to 800° C., and
- a solid feedstock comprising fixed-carbon elements (non-gasifiable under the conditions of the process according to the invention, materials commonly referred to as petroleum coke); solid or pasty hydrocarbon-based molecules may also be present in this residual gasification substance. These materials are then at a temperature of greater than or equal to 400/500° C.

The fact that the temperature of the first gaseous stream is higher than the temperature of the solid feedstock is explained by the fact that oxygen elements, still present in the gaseous effluent, continue to oxidize gaseous hydrocarbon-based molecules after the gasification of these molecules, downstream of the first perforated plates 104.

The system 100 also comprises, downstream of the perforated plates 104, a zone 112 called homogenization chamber provided for receiving the first gaseous stream and for carrying out the expansion and the homogenization of the first gaseous stream with respect to temperature.

This homogenization chamber 112 also comprises temperature probes 114, distributed on either side of the perforated plates 104, which control the increase in the temperature in the chamber 112 and between said perforated plates, when the objective thereof is to allow an additional oxycombustion which maintains the hydrocarbon-based materials gasification temperature. It is these temperature probes 108 and 114 which manage the electronic control for oxygen injection into the gaseous effluent via the injection opening 110 and via an injection opening 116 which opens out into the homogenization chamber.

The introduction of oxygen, via the admission of the primary gaseous effluent, is proportional to the amount of hydrocarbon-based materials and/or of hydrocarbon-based compounds that it is desired to convert, with a view to obtaining a first gaseous stream in the homogenization chamber 112 at a temperature of at least 800° C. Examples of proportions of oxygen introduced at this stage are given later in the case of a particular example of hydrocarbon-based molecules.

The system 100 also comprises a zone 118, called oxidation chamber, located at the bottom of the perforated plates 104 and into which said perforated plates 104 open out. This oxidation chamber 118 is provided for receiving the non-gaseous feedstock, namely the pasty and/or solid feedstock previously obtained, after gasification of the gasifiable part of the hydrocarbon-based materials, this non-gaseous feedstock flowing, via gravity, onto the perforated plate 104 so as to fall, by gravity, into the oxidation chamber 118. The non-gaseous feedstock arriving in the oxidation chamber 118 is at a temperature of greater than 400-500° C.

The system 100 also comprises an opening 120 for introducing an "oxidation" gaseous stream consisting of $CO_2$ and of $O_2$ into the oxidation chamber 118. The oxidation gaseous stream has the role of oxidizing, via $O_2$ molecules, the non-gaseous hydrocarbon-based molecules comprising fixed-carbon elements contained in the non-gaseous feedstock which arrives in the oxidation chamber by gravity. The temperature of the chamber 118 is controlled by a probe 122 which acts on the admission of oxygen into said oxidation chamber via an injection opening 124.

The objective of the introduction of pure oxygen into the oxidation chamber 118 is to carry out the oxycombustion of the hydrocarbon-based molecules contained in the chamber 118; this oxycombustion is complete; the result is the generation of a second gaseous stream composed of $CO_2$ and $H_2O$ and possibly of the residual $O_2$ at a temperature of greater than or equal to 1200° C. This gaseous stream is thus heat-transferring and reactive, and its interaction/mixing with the first gaseous stream places these two streams under redox reaction conditions. Indeed, the pure oxygen introduced into the oxidation chamber 118 performs an exothermic oxidation of the carbon-based and/or hydrocarbon-based molecules. The amount of oxygen introduced is controlled such that the content of the oxidation chamber 118 is brought to a temperature of at least 1200° C. Additional oxygen can be introduced via the same channel so as to provide, where appropriate, the thermal generation means that can be used to compensate for the endothermicity of reduction of the $CO_2$ by the reducing carbons of the first gaseous stream. Examples of proportions of oxygen introduced are given later in the case of a particular example of hydrocarbon-based molecules.

Moreover, the oxidation gaseous stream may be a stream that has been preheated with a view to reducing the amount of oxygen injected into the oxidation chamber 118.

The oxidation of the fixed carbons in the oxidation chamber 118 provides a second gaseous stream at a temperature of greater than or equal to 1200° C., this gaseous stream comprising only $CO_2$ molecules and possibly $H_2O$ molecules, oxygen molecules and sulfur-containing molecules. The oxidation also provides solid, incombustible, non-gasifiable residues such as ores contained in the hydrocarbon-based raw materials, which are discharged out of the system by gravitation at the bottom of the oxidation chamber 118 via an airtight mechanism (not represented).

The system 100 also comprises a zone 126, called thermal conditioning chamber, which is the continuation of the oxidation chamber 118. It is configured so as to channel the flow of the second gaseous stream, generated in the oxidation chamber 118, to a zone 128, termed mixing chamber, where the mixing of the first gaseous stream and of the second gaseous stream is carried out.

This thermal conditioning chamber 126 is the separation between the chambers 112 and 128, and it is designed so as to force the first gaseous stream to flow to the mixing chamber 128, via a tubular network 130 which crosses said thermal conditioning chamber 126 and allows communication between the two chambers 112 and 128. The tubular network 130 is arranged in the longitudinal direction of flow, without deviation, from the chamber 112 to the chamber 128 and perpendicular to the direction of flow of the second gaseous stream, from the chamber 118 to the chamber 128, said flow following a deviated path. The role of the thermal conditioning chamber 126 is to carry out an indirect, i.e. without contact, heat exchange between the first gaseous stream and the second gaseous stream so that a part of the heat from the second gaseous stream is transmitted to the first gaseous stream.

The thermal conditioning chamber 126 is therefore a heat exchanger where the temperatures of the first and second gaseous streams are made homogeneous before they are combined in the mixing chamber 128 for the final phase of redox conversion of the (oxidizing) $CO_2$ of the second gaseous stream by the (reducing) hydrocarbon-based molecules of the first gaseous stream. This thermal conditioning chamber 126 is composed of a casing which forms a parallelepipedal box which occupies the entire area of the cross section of the system. The volume of this box is closed on the four sides which mold the walls of the system 100, and the tubular network 130 is welded leaktight on the side of the homogenization chamber 126. The parallelepipedal box is not rigidly connected to the vertical and upper walls of the system, so as to allow said box to dilate (a minimum passage of the first gaseous stream is thus admitted on either side of this volume); said volume has no bottom, thus allowing communication with the oxidation chamber 118. The wall of said parallelepipedal box which separates the thermal conditioning chamber 126 from the mixing chamber 128 is configured for holding in place and dilating the tubes 132 making up the network of tubes 130 and arranged in parallel to the direction of the first gaseous stream transiting from the homogenization chamber 112 to the mixing chamber 128, and has an openwork design so as to allow the second gaseous stream to flow from the thermal conditioning chamber 126 into the mixing chamber 128.

The tubes 132 are welded leaktight on the wall of the parallelepipedal casing, on the side of the homogenization chamber 112, and just held on the side of the mixing chamber 128. These tubes therefore pass right through the thermal conditioning chamber 126 and their objective is to channel the first gaseous stream and to allow this first gaseous stream to pass from the homogenization chamber 112 to the mixing chamber 128 while carrying out a heat exchange with the second gaseous stream which itself is channeled by the parallelepipedal shape.

Given the temperature of the second gaseous stream originating from the oxidation chamber 118 (greater than or equal to 1200° C.), the wall in contact with the first gaseous stream originating from the homogenization chamber is at a temperature of less than or equal to 1200° C.

The parallelepipedal casing is adjusted non-sealed to the walls of the system in order to manage the dilations; a part of the gaseous whole originating from the homogenization chamber 112 can therefore pass through these interstices where the heat exchange takes place on contact with the walls of the casing which channels the second gaseous stream at 1200° C.

The first gaseous stream and the second gaseous stream are at a temperature of greater than 1000° C. when arriving in the mixing chamber 128. The objective of the mixing of the two gaseous streams is to complete the redox reaction by the hydrocarbon-based molecules contained in the first gaseous stream:
- the hydrocarbon-based gaseous molecules are eminently flammable, and therefore in a state to interact with any available oxygen atom, in particular oxidizing molecules,
- the oxidizing molecules react instantaneously with the carbon reducing agents of the hydrocarbon-based molecule, and
- the additional oxygen introduced, under strict control, with the second gaseous stream controls and regulates the thermal needs and maintains the optimal conditions of the redox thermochemical reaction. The parameters of the thermochemical reaction in the mixing chamber 128 are controlled by a temperature probe 134.

The mixing chamber 128 also comprises an opening 136 for taking a sample for a spectrometric analysis of the components of the third gaseous stream.

Each of the temperature probes used in the system 100 may be an infrared temperature probe.

The mixing of the two gaseous streams makes it possible to obtain a third gaseous stream, which is at a temperature of less than or equal to 1200° C. and which comprises CO, $H_2$ and $H_2O$ molecules and possibly sulfur-based molecules of formulae $S_x$.

The system 100 comprises an opening 138 for extraction of the third gaseous stream from the mixing chamber 128 to the exterior of the system 100.

In the example described above, the hydrocarbon-based materials are brought to autoignition temperature by mixing with a gaseous effluent. However, in another embodiment, the hydrocarbon-based materials can be brought to the autoignition temperature by indirect heating, i.e. heating without mixing with a gaseous effluent, for example by means of the first perforated plate which may be heated and which then heats the hydrocarbon-based materials. In this case, the injection of oxygen can be carried out at the level of the perforated plate, the perforations of which are no longer necessary.

The composition of the first gaseous stream, of the second gaseous stream and of the third gaseous stream in various embodiments will now be given.

If the gaseous effluent is an exhaust effluent and/or an industrial flue gas:
- the first gaseous stream comprises $N_2$, $O_2$, $NO_x$, $SO_x$, CO, $CO_2$ and $H_2O$ molecules and gaseous hydrocarbon-based molecules. These molecules become homogeneous, in terms of temperature and distribution, in the homogenization chamber before they are suctioned into the mixing chamber;
- the second gaseous stream comprises $CO_2$, $O_2$ and possibly $H_2O$ molecules and possibly sulfur-containing molecules of formulae $SO_x$;
- the third gaseous stream comprises $N_2$, $S_2$, CO, $H_2$ and $H_2O$ molecules and sulfur-containing molecules of formulae $S_x$.

If the gaseous effluent is $CO_2$:
- the first gaseous stream comprises $CO_2$, CO and $H_2O$ molecules and gaseous hydrocarbon-based molecules. These molecules become homogeneous, in terms of temperature and distribution, in the homogenization chamber before they are suctioned into the mixing chamber;
- the second gaseous stream comprises $CO_2$, $O_2$ and possibly $H_2O$ molecules and possibly sulfur-containing molecules of formulae $SO_x$;
- the third gaseous stream comprises CO, $H_2$ and $H_2O$ molecules and sulfur-containing molecules of formulae $S_x$.

When no gaseous effluent is used to bring the hydrocarbon-based materials to the autoignition temperature:
- the first gaseous stream comprises gaseous hydrocarbon-based molecules and CO and $H_2O$ molecules. These molecules become homogeneous, in terms of temperature and distribution, in the homogenization chamber before they are suctioned into the mixing chamber;
- the second gaseous stream comprises $CO_2$, $O_2$ and possibly $H_2O$ molecules and possibly sulfur-containing molecules of formulae $SO_x$;
- the third gaseous stream comprises CO, $H_2$ and $H_2O$ molecules and sulfur-containing molecules of formulae $S_x$.

The process according to the invention applies more particularly to all liquid and/or pasty materials of which the hydrocarbon-based molecules comprise carbon multiples ($C_n$) of less and/or greater than $C_{16}$.

An example of treatment of the hydrocarbon-based materials when the hydrocarbon-based molecules treated are hexadecane, which corresponds to heavy fuel oil No. 2 and has the formula $C_{16}H_{34}$, will now be given.

When the gaseous effluent used is pure $CO_2$ for treating one mol of hexadecane $C_{16}H_{34}$; the reactions which take place and the amounts of $CO_2$ and $O_2$ used are the following:

During the gasification: 4.15 mol of $CO_2$ and 2.465 mol of $O_2$ are introduced
  The reactions which take place are:
    oxidation of 9.86 mol of hydrogen (H) out of 34, i.e. 4.93 mol of hydrogen ($H_2$) in $H_2O$ and generation of 1193.35 kJ, thermal energy which raises the temperature of the medium to T°>800° C.
    gasification of the gasifiable part of the raw material±80% of gaseous hexadecane molecules at T°≥800° C.
    generation of 3.92 mol of fixed carbons ("petroleum coke" non-gasifiable part of the raw material)±20% at T°≥500° C.
  These reactions produce a first gaseous stream and fixed carbons, the gaseous stream comprising:
    4.93 mol of $H_2O$, consequence of the oxycombustion of the hydrogen (exo-energetic oxy-dehydrogenation phase) of the hexadecane mole fraction corresponding to the heat provision from gasification
    approximately 56% of the mole of hexadecane gasified, the temperature of which is >800° C. and the elements of which (C and H) are eminently flammable and therefore in the form of potential reducing agents of any oxidizing molecule
    aerosol particles of carbon and CO and $H_2$ molecules can be noted in the first gaseous stream according to the interactions and redox reactions relating to the regulation of the temperature of the medium; depending on whether the temperature increases, $H_2O$ can be reduced by (C) reducing agent (present in the gaseous stream in aerosol form after the oxy-dehydrogenation of the hexadecane molecule); since this reaction is endothermic, it regulates any untimely increase in the temperature of the medium; the reaction stops as soon as the temperature drops below the redox reaction threshold or as soon as there is no more reducing carbon. The redox reaction $CO_2+C=2CO+172$ kJ/mol can also interact in the event of an untimely increase in the temperature of the medium, but at this stage, the temperature regulation is automatically managed by the admission of oxygen, 4.15 mol of $CO_2$ which are brought to the temperature of the medium, before being introduced as a mixture with the second gaseous stream where they will be the oxidizing agents of the redox reaction including the 3.92 mol of fixed carbon which fall by gravity into the oxidation zone of the reactor;

During the oxidation of the fixed carbons: 5 mol of $CO_2$ and 5.02 mol of $O_2$ are introduced The reactions which take place are:
the 3.92 mol of fixed carbons are oxycombusted to $CO_2$ by as many moles of oxygen These introductions and reactions produce a second gaseous stream comprising 8.92 mol of $CO_2$, 1.10 mol of $O_2$ which will be the oxidant of the oxycombustion dedicated to the energy compensation for the endothermicity of the redox reaction that will occur during the mixing of the first and second gaseous streams so as to form the third gaseous stream;

During the mixing of the first and second gaseous streams:
the first gaseous stream at a temperature>800° C. and the second gaseous stream at a temperature>1200° C. are introduced into the mixing chamber, by means of a "thermal conditioning" chamber (a heat exchanger opens onto the three chambers without direct communication between the streams 1 and 2) where the temperature of the two streams will become homogeneous The reactions which take place are:
the oxygen of the second gaseous stream reacts instantaneously with the gaseous hexadecane part, this oxycombustion raises the temperature of the medium and provides the energy that can be used for the reduction of the $CO_2$ by the reducing carbons of the gasified hexane redox reaction ($CO_2+C=2CO+172$ kJ/mol) of the $CO_2$ of the first and second gaseous streams with the reducing carbons of the gasified hexane of the first gaseous stream disassembly of the hexadecane molecules and release of molecular hydrogen which does not have the possibility of capturing oxygen in the medium of the third mixing zone. Depending on the choice of temperature regulation, a secondary redox reaction may be initiated in the mixing medium: $CO+H_2O=CO_2+H_2-41$ kJ/mol which makes it possible to vary the $H_2$ content of the syngas, at the expense of the CO (this depends on the use envisaged for the syngas which may thus be more or less readily flammable).

These reactions produce a third gaseous stream, the temperature of which is between 1000/1200° C., comprising:

24.15 mol of CO, the gross calorific value (GCV) of which is 6835.53 kJ 10.10 mol of $H_2$, the gross calorific value (GCV) of which is 2443.35 kJ 13.80 mol of $H_2O$ One mol of hexadecane ($C_{16}H_{34}$) has a GCV of 10418 kJ, the syngas obtained has a GCV of 9278.88 kJ, i.e. an energy transfer of 90%, and the replacement of an energy source of a poorly exploitable raw material with a syngas, a new energy source that can be used in all the existing thermal systems; the sensitive heat of the third gaseous stream represents an energy≥1114 kJ; recycled into the system for the subsequent cycle, this energy is subtracted from that produced for the various actions/reactions, saving oxygen and hydrogen; the energy saved results in additional $H_2$ molecules in the syngas, the GCV of these molecules brings the GCV of the syngas to 10417.70 kJ, i.e. 99.99% of the potential energy of the raw material.

When the gaseous effluent used is an exhaust gas and/or industrial gaseous effluents originating from an atmospheric combustion of any fuel, the effluent is at a certain temperature (therefore has a recyclable thermal capacity) and will be brought to the temperature of at least 300° C. if this is necessary; generally, the effluent is composed of $N_2$, $H_2O$, $CO_2$, CO, $O_2$, organic particles (most commonly carbon-based particles, which are therefore combustible), $NO_x$ and possibly $SO_x$; the process according to the invention consists in carrying out a numerical analysis of the oxygen elements contained in the effluent, in the form of $O_2$ and/or of elementary oxides and in establishing the ratio between this numeration and the amount of oxygen involved in the reaction described in the previous paragraph, so that the proportion (and the corresponding volume of effluent) corresponds to one mol of $C_{16}H_{34}$. The reactions which take place during the steps are identical to the description mentioned, and the amounts of $CO_2$ and of $O_2$ added are relative to all the factors; thus, the differences that will be clear, compared with the previous description, will be at the level of the first and third streams, the second stream being identical:

During the gasification:
The reactions which take place are:
partial oxycombustion of the mole of hexadecane by the oxygen contained in the effluent to be treated, this reaction is identical to that of the previous description; this oxidation causes the exo-energetic oxido-dehydrogenation of the $C_{16}H_{34}$ molecule required for the generation of energy for gasification of the volatile part of said molecule; thus, the mole of hexadecane undergoes the same interactions as those previously described; according to the prior analysis, the "free" oxygen contained in the relative proportion of effluent is defined so as to generate the exothermicity required for this first reaction; thus, the hexadecane vapors are extremely flammable and its constituent elements (C and H) are obvious reducing agents; all the oxidizing agents ($NO_x$, $SO_x$) of the effluent will enter into a redox reaction with these elements.

The reactions produce a first gaseous stream which comprises the same molecules as in the previous description with the nitrogen ($N_2$) molecules contained in the relative volume (relative to one mol of hexadecane) of initial effluent; in addition to the molecule which is in the natural $N_2$ form, there is the nitrogen molecule, present in the effluent in the elemental oxide state ($NO_x$), that will possibly (during this first redox reaction) be reduced on contact with the mole of hexadecane, itself brought to the autoignition temperature by the gaseous effluent, by oxidizing the hydrogen of said $C_{16}H_{34}$ molecule and thus carrying out a part of the exo-energetic oxido-dehydrogenation that the addition of oxygen generates in the previous description.

During the oxidation:
  the reactions which take place are the same as in the previous description,
  these reactions produce a second gaseous stream identical to that of the previous description.

During the mixing of the first and second gaseous streams:
  the reactions which take place are the same as in the previous description with the end being the redox reaction defined for the treatment of the initial gaseous effluent; during this mixing phase, the oxidizing agents which have not been reduced ($NO_x$, $SO_x$) are reduced at the same time as the $CO_2$ and possibly as certain $H_2O$ molecules,
  these reactions produce a third gaseous stream identical to that of the previous description, supplemented with the deoxidized molecules that were contained in the initial effluent ($N_2$, $S_2$). The nitrogen will be a neutral "ballast" volume in the use that will be made of the syngas contained in said third stream. This volume can be proportioned as desired by reducing the proportion of initial effluent per mole of hexadecane.

Figure 2:
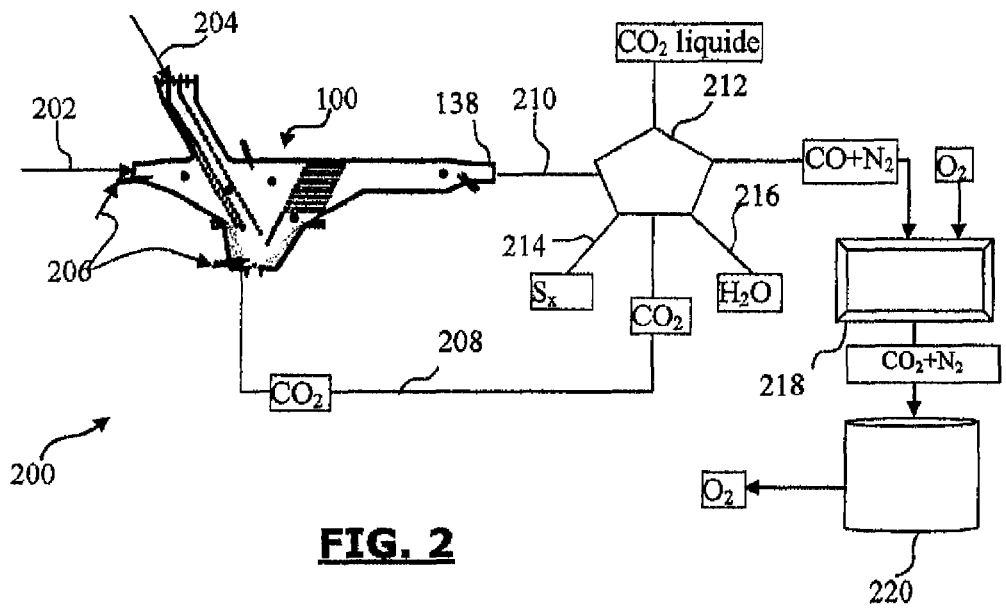
FIG. 2 is a diagrammatic representation of a first embodiment of an apparatus according to the invention implementing the system of FIG. 1.

FIG. 2 is a diagrammatic representation of an apparatus according to the invention implementing the system 100 of FIG. 1 in the case where the gaseous effluent is an exhaust gas.

The apparatus 200 comprises:
  a circuit 202 for bringing the exhaust gas into the system 100,
  a circuit 204 for bringing the hydrocarbon-based materials into the system 100,
  a circuit 206 for bringing oxygen into the system 100 for the oxidation and gasification reaction,
  a circuit 208 for bringing the oxidation gaseous stream into the system 100 for the oxidation reaction, and
  a circuit 210 for recovering the third gaseous stream at the outlet 130 of the system 100.

The apparatus also comprises a heat exchanger 212, connected to the recovering circuit 210 for carrying out a heat exchange between the third gaseous stream and liquid or cold $CO_2$. This heat exchange makes it possible to carry out:
  cooling of the third gaseous stream with a view to separating first the sulfur-containing molecules of formula $S_x$ present in the third gaseous stream and then the water present in the third gaseous stream, and,
  heating of the cold or liquid $CO_2$ to a temperature of 1200° C. with a view to obtaining the oxidation gaseous stream.

The condensed/separated sulfur-containing molecules of the third gaseous stream are recovered by means of a recovering circuit 214, the condensed/separated water is recovered by means of a water-recovering circuit 216 and the hot $CO_2$ obtained is entered into the circuit 210 for bringing the oxidation gaseous stream into the system.

The heat exchanger 212 provides a fourth gaseous stream comprising only CO and $N_2$ molecules.

The apparatus 200 also comprises an electricity-cogenerating device 218 in which the fourth gaseous stream is oxidized by pure oxygen $O_2$ and which provides a fifth gaseous stream comprising only $CO_2$ and molecules of formula $N_2$.

This fifth gaseous stream is supplied to a microalgal reactor 220 for the culturing of microalgae and provides oxygen by photosynthesis and microalgae which represent biomass which can be exploited by combustion or by treatment under $CO_2$.

The oxygen provided by the microalgal reactor 220 can be reused in the process, system and apparatus according to the invention.

Figure 3:
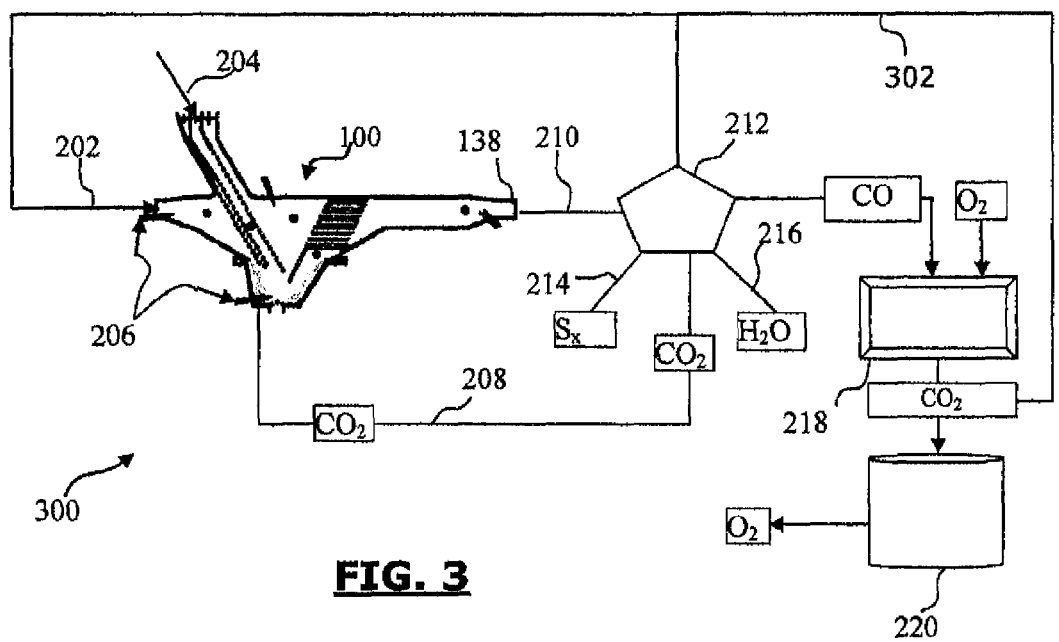
FIG. 3 is a diagrammatic representation of a second embodiment of an apparatus according to the invention implementing the system of FIG. 1.

FIG. 3 is a diagrammatic representation of another example of an apparatus according to the invention implementing the system 100 of FIG. 1 in the case where the gaseous effluent is a gaseous stream of pure $CO_2$.

The apparatus 300 represented in FIG. 3 is identical to the apparatus 200 of FIG. 2, with the exception that the fourth gaseous stream comprises only CO and, when it is exploited under pure oxygen in the electricity-cogenerating device 218, the fifth gaseous stream comprises only $CO_2$.

A part of this fifth gaseous stream which comprises only $CO_2$ is used in the microalgal reactor 220. Another part of the fifth gaseous stream comprising only $CO_2$, recovered by means of a recycling circuit 302, is reused as oxidation gaseous stream and/or as gaseous effluent in the system 100.

Certainly, the invention is not limited to the examples which have just been described.

What is claimed is:

1. A process for treating liquid and/or pasty hydrocarbon-based materials, the process comprising the following steps:
  bringing of said hydrocarbon-based materials to a temperature greater than or equal to the autoignition temperature of said hydrocarbon-based materials;
  gasification of said hydrocarbon-based materials by injection of a controlled amount of oxygen, said gasification producing:
    a first gaseous stream at a temperature of greater than or equal to 800° C. comprising CO and $H_2O$ molecules, hydrocarbon-based molecules in the gaseous phase and $H_2$ molecules, and
    a non-gaseous feedstock comprising non-gaseous hydrocarbon-based molecules;
  oxidation of said non-gaseous hydrocarbon-based molecules contained in said non-gaseous feedstock, by means of an oxidation gaseous stream consisting of $O_2$ and $CO_2$ at a temperature of between 1000° C. and 1200° C., said oxidation producing a second gaseous stream comprising $CO_2$, $O_2$ and $H_2O$ molecules; and
  mixing of said first and said second gaseous streams, said mixing causing the oxidation of the gaseous-phase hydrocarbon-based molecules present in the first gaseous stream by $CO_2$ and $O_2$ molecules present in the second gaseous stream, said mixing producing a third gaseous stream comprising CO, $H_2O$ and $H_2$ molecules.

2. The process as claimed in claim 1, wherein the step of bringing the hydrocarbon-based materials to a temperature greater than or equal to the autoignition temperature is carried out by indirect heating of said hydrocarbon-based materials.

3. The process as claimed in claim 1, wherein the step of bringing the hydrocarbon-based materials to a temperature greater than or equal to the autoignition temperature is carried out by mixing said hydrocarbon-based materials with a gaseous effluent having a temperature greater than or equal to the temperature of the hydrocarbon-based materials.

4. The process as claimed in claim 3, wherein the gaseous effluent is an exhaust gas from a fuel combustion device, said exhaust gas comprising: $N_2$, $CO_2$, $NO_x$, $SO_x$, CO and $O_2$.

5. The process as claimed in claim 4, wherein the mixing of the first and second gaseous streams produces the deoxidation, by the gaseous hydrocarbon-based molecules present in the first gaseous stream, of the $NO_x$ and $SO_x$ molecules present in the first gaseous stream and of the $CO_2$ and $O_2$ molecules present in the second gaseous stream, the third gaseous stream then comprising the $N_2$, $S_2$, CO and $H_2O$ molecules and optionally the $CO_2$ and $H_2$ molecules at a temperature of between 1000 and 1200° C.

6. The process as claimed in claim 3, wherein the gaseous effluent is a gaseous stream consisting of pure $CO_2$.

7. The process as claimed in claim 6, wherein the mixing of the first and second gaseous streams produces the deoxidation, by the gaseous-phase hydrocarbon-based molecules present in the first gaseous stream, of the $CO_2$ and $O_2$ molecules present in the second gaseous stream, the third gaseous stream then comprising CO and $H_2O$ molecules at a temperature of between 1000 and 1200° C.

8. The process as claimed in claim 1, further comprising cooling of the third gaseous steam, by heat exchange with a gaseous stream of $CO_2$.

9. The process as claimed in claim 8, further comprising a separation of unwanted molecules during the cooling step.

10. The process as claimed in claim 1, wherein the liquid and/or pasty hydrocarbon-based materials comprise heavy fuel oil.

11. The process as claimed in claim 1, where the liquid and/or pasty hydrocarbon-based materials are of heavy fuel oil of category 2 or higher, tar sands, or earths polluted by hydrocarbons.

* * * * *